United States Patent
Hefti

[15] 3,645,002
[45] Feb. 29, 1972

[54] LINEAR MEASURING INSTRUMENT
[72] Inventor: Willy Hefti, Lausanne, Switzerland
[73] Assignee: Hebor S. A., Lausanne, Switzerland
[22] Filed: Oct. 27, 1969
[21] Appl. No.: 869,626

[52] U.S. Cl. ...................................33/172 R, 33/169 B
[51] Int. Cl. ....................G01b 3/22, G01b 5/00, G01b 5/18
[58] Field of Search ............33/172 R, 169 B, 169 F, 178 D, 33/137

[56] References Cited

UNITED STATES PATENTS

| 2,770,883 | 11/1956 | Hackney | 33/137 |
| 1,019,400 | 3/1912 | Zuegner | 37/172 R |
| 2,560,571 | 7/1951 | Hawkins | 33/172 R |
| 1,927,821 | 9/1933 | Abbott | 33/169 F |
| 1,619,370 | 3/1927 | Robbins | 33/172 R |

FOREIGN PATENTS OR APPLICATIONS

| 99,988 | 10/1940 | Sweden | 33/172 R |
| 1,381,392 | 11/1964 | France | 33/172 R |

*Primary Examiner*—Leonard Forman
*Assistant Examiner*—A. J. Mirabito
*Attorney*—Robert E. Burns and Emmanuel J. Lobato

[57] ABSTRACT

A linear measuring apparatus comprises support feet for placing on a reference plane. A rod is movable perpendicularly to the plane against the action of a return spring. An extremity of the rod has a sidewardly protruding flange with vertical play equal to its own thickness. The rod has a rack driving a pinion with a pointer which directly indicates a measurement with reference to the plane, taken from either the upper or lower surface of the flange.

6 Claims, 3 Drawing Figures

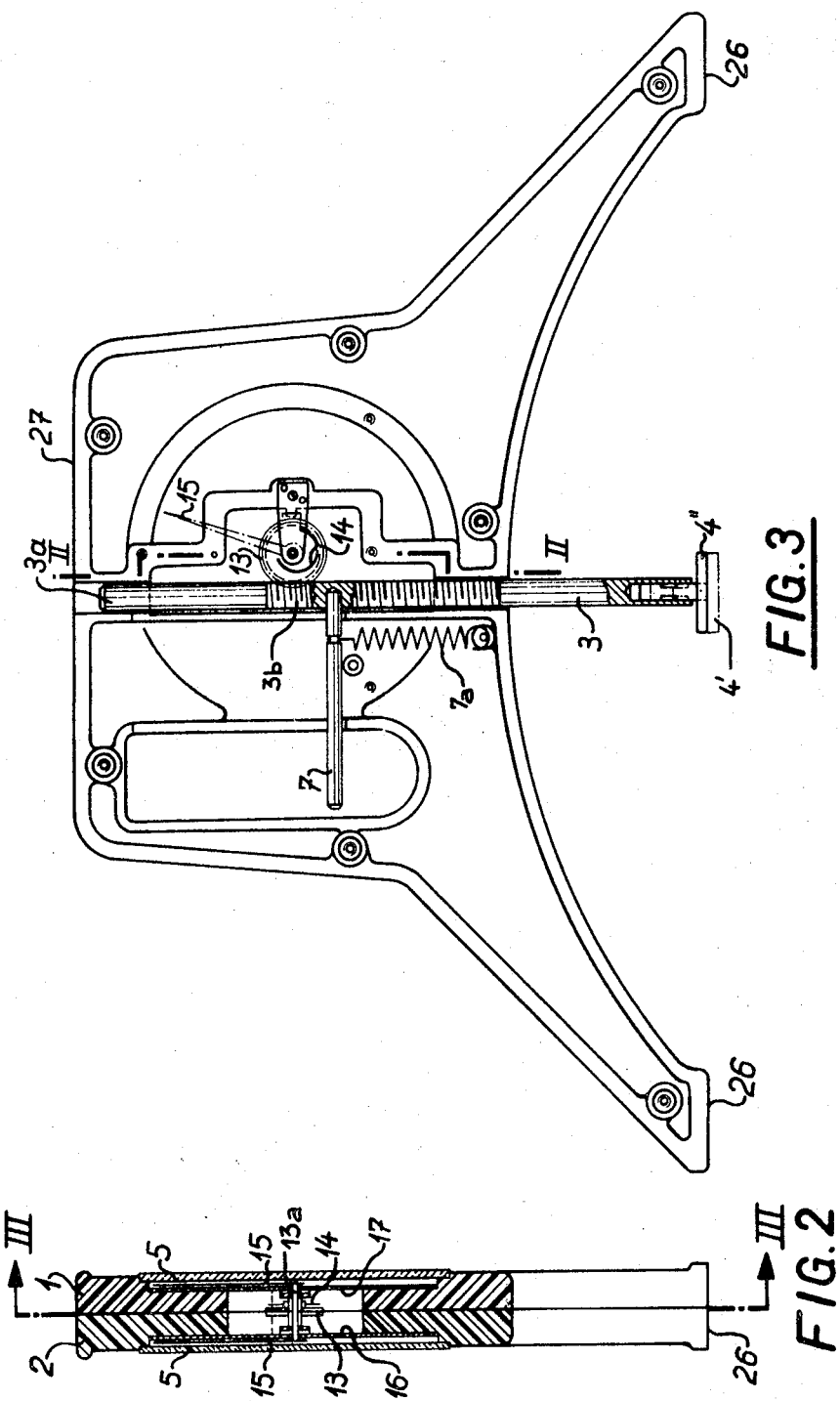

LINEAR MEASURING INSTRUMENT

It is an object of the invention to provide an apparatus suitable for measuring the overlap of cutters in relation to the plane of a machine for working wood, notably for the adjustment of milling cutters or vertical shapers and for the knives of flanging machines.

A linear measuring apparatus according to the invention comprises support means for the apparatus on a plane to be used as reference plane, a rod moveable perpendicularly to said plane, a lever for moving said rod and spring means for returning said rod, a sidewardly protruding flange provided on an extremity of said rod with a vertical play equal to its own thickness, and means for indicating a measurement with reference to said plane taken from either the upper or lower surface of said flange.

An embodiment of the invention will now be described, by way of example, with reference to the accompanying drawings in which:

FIG. 2 is a cross section along line II—II of FIG. 1, and

FIG. 3 is a cross section along line III—III of FIG. 2.

Figure 1:
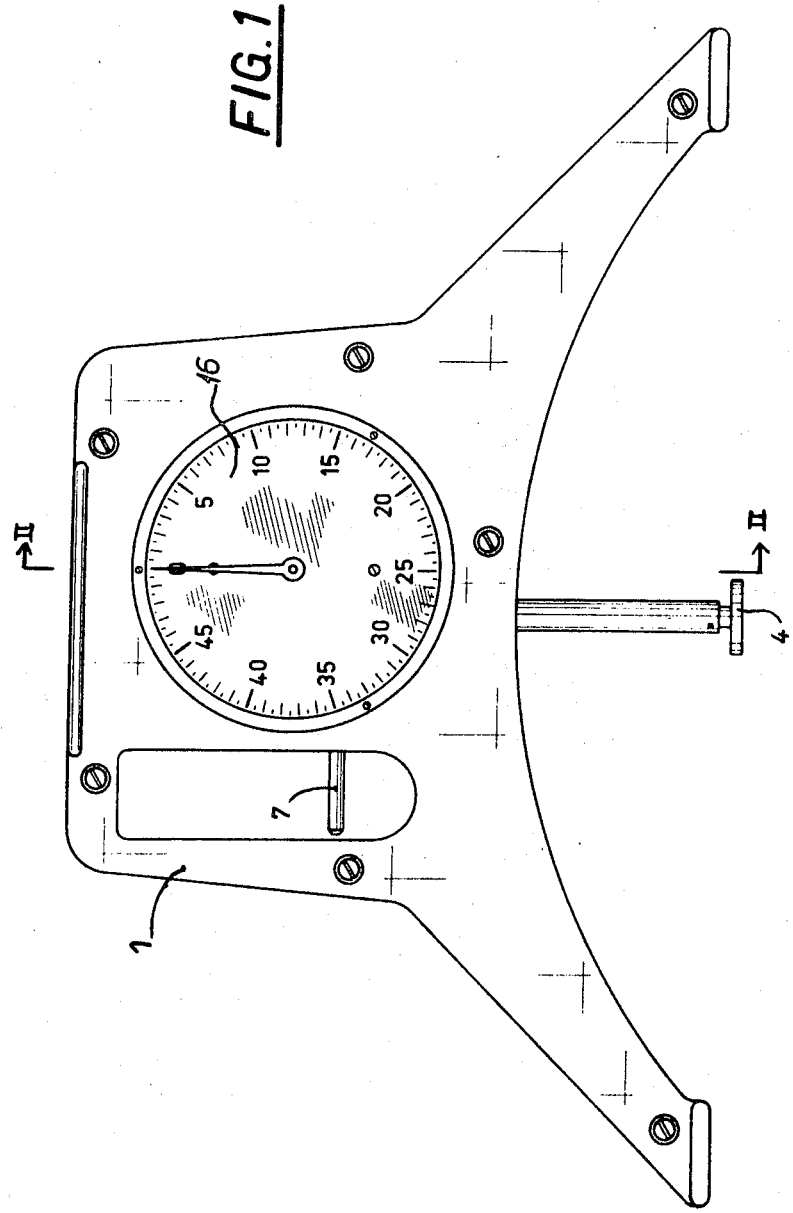
FIG. 1 is a face view of a measuring device according to the invention.

The apparatus comprises two side plates 1 and 2, fixed together for example by means of bolts, to form a body for the apparatus. This body can be supported on two feet of which the lower surfaces form a reference plane from which measurements can be taken.

A rod 3 can move vertically in the apparatus and is provided with a spring-loaded control lever 7 by means of which it can be raised, return being ensured by spring 7a. At the bottom of rod 3 is moveably attached a flange 4. The flange is shown in its lowermost position in FIG. 1, while in FIG. 3 its two positions 4' and 4" are schematically indicated. The vertical play of flange 4 is arranged to be the same as the thickness of the protruding part of the flange.

Rod 3 is provided with a rack 3b which cooperates with a toothed pinion 13 mounted on a shaft 13a and provided with a spiral spring 14. Two pointers 15 are also mounted on shaft 13a and raising or lowering of lever 7 causes these pointers to move around graduated scales 16 and 17 which are each covered with a transparent cover 5, for example in glass or in synthetic material.

The instrument is used as follows:

To measure on top of an overlap of a piece of wood being worked, the surfaces 26 are placed on a reference surface, with the lever 7 raised. Lever 7 is then lowered onto the overlap and, because of the action of spring 7a, the flange 4 is in its upper position 4". The reading is given directly on one of the scales.

To measure under an overlap, the surfaces 26 are placed on a reference surface with lever 7 down and flange 4 under the overlap to be measured. Lever 7 is then raised so that the flange abuts the overlap and, in this case, the flange is in its lower position 4'. The reading is given directly without any need for a correction due to the thickness of the flange.

Rod 3 is also provided with an upper part 3a which can protrude out of upper surface 27 upon raising lever 7. This can be used to measure the depth of a hole or groove in an object placed on surface 27. One of the scales can be adapted to directly indicate such a measurement, while the other scale directly indicates a measure taken with the flange 4. Obviously the two scales could be made to coincide.

It is additionally possible to provide feet 26 with retractable prolongations, for example articulated to the extremities of these feet, in order to increase the range of uses for the apparatus.

What is claimed is:

1. Apparatus for measuring the overlap of cutters in relation to a reference plane in a woodworking machine, comprising a body, means for supporting said body on a reference plane, a rod slidably mounted in said body for lengthwise movement in a direction perpendicular to a plane defined by said supporting means, a lever extending laterally from said rod for moving said rod in one direction, spring means for moving said rod in the opposite direction, a sidewardly protruding flange slidably mounted on an extremity of said rod extending beyond said plane with play equal to its own thickness in a direction lengthwise of said rod, a rack formed on a portion of said rod inside body, a pinion rotatably mounted in said body in meshing engagement with said rack a pointer fixed, to said pinion and a scale on said body concentric with said pinion and cooperating with said points to indicate a measurement with reference to said plane taken from either the upper or lower surface of said flange.

2. Apparatus according to claim 1, in which said pinion is fixed on a shaft rotatably supported in said body and in which pointers fixed on opposite ends of said shaft cooperate with scales at opposite faces of said body wherein said measurement is indicated on both of opposite faces of said body.

3. Apparatus according to claim 1, in which said body is provided with a recess parallel to said rod and in which said lever is fixed to said body and projects laterally therefrom into said recess in which it is accessible for digital operation.

4. Apparatus according to claim 3, in which said spring means comprises a tension spring acting between said lever and a portion of said body.

5. Apparatus according to claim 1, further comprising spiral spring means acting between said pinion and said body to apply a torque to said pinions.

6. Apparatus according to claim 1, in which the side of said body opposite said supporting means is provided with a reference surface parallel to the plane defined by said supporting means, and in which the extremity of said rod opposite that on which said flange is provided is extendable out through an opening in said reference surface by an amount indicated by said points in cooperation with said scale.

* * * * *